J. R., S. B. & G. W. RUDE.
CORN-DRILL.

No. 170,902.  Patented Dec. 7, 1875.

WITNESSES  
Henry N. Miller  
C. L. Evert

INVENTOR  
J. R. Rude, S. B. Rude and G. W. Rude  
By Alexander Mason  
Attorneys

UNITED STATES PATENT OFFICE.

JOHN R. RUDE, SQUIRE B. RUDE, AND GEORGE W. RUDE, OF LIBERTY, IND.

IMPROVEMENT IN CORN-DRILLS.

Specification forming part of Letters Patent No. 170,902, dated December 7, 1875; application filed August 14, 1875.

*To all whom it may concern:*

Be it known that we, JOHN R. RUDE, SQUIRE B. RUDE, and GEORGE W. RUDE, of Liberty, in the county of Union and in the State of Indiana, have invented certain new and useful Improvements in Corn-Drills; and do hereby declare that the following is a full, clear, and exact description thereof, reference being had to the accompanying drawings, and to the letters of reference marked thereon, making a part of this specification.

Our invention relates to new and useful improvements in corn-drills for the purpose of planting corn in rows or drills, one grain or seed at a time, and to plant the grains the desired distance apart; and the nature of our invention consists in the construction and novel arrangement of a feeding device for drilling machines, as will be hereinafter more fully set forth.

In order to enable others skilled in the art to which our invention appertains to make and use the same, we will now proceed to describe its construction and operation, referring to the annexed drawing, in which—

Figure 1:
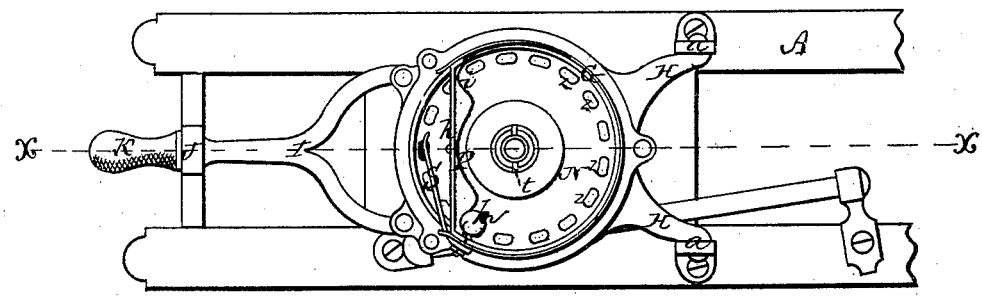
Figure 2:
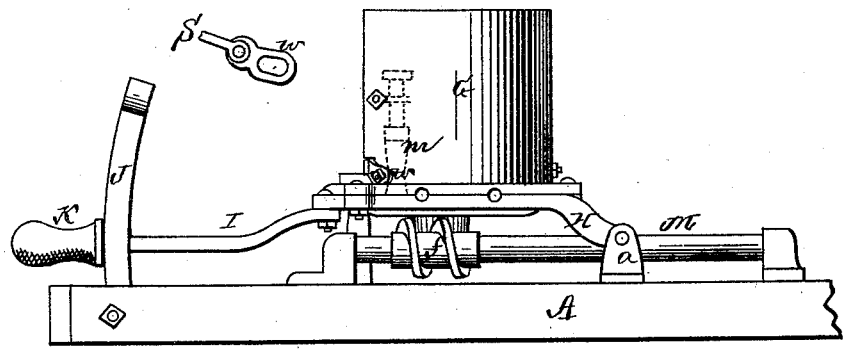

Figure 1 is a plan view of our invention. Fig. 2 is a side elevation, and Fig. 3 a longitudinal vertical section, of the same.

Figure 3:
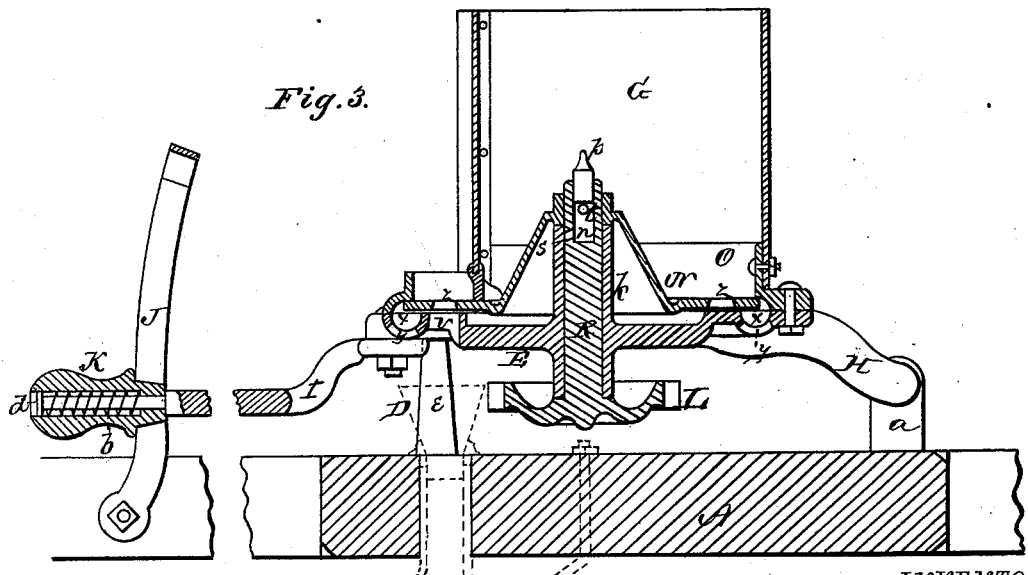

A represents the frame, with shovel B, having brace C, as described in our Patent No. 95,607. D is a funnel-shaped conductor, for the purpose of conducting the corn or seed to the shovel B, said shovel being made tubular in shape for the purpose of conducting the corn to the ground. E is a frame or plate for the seed-box or hopper G, having arms or extensions H at the rear end, which are hinged to brackets $a$, bolted to the frame A, for the purpose of allowing the frame E to be raised or lowered, as hereinafter fully described. On the front end of the plate E is bolted a lever, I, extending back and in rear of said plate, and passing through a slot in the lock-bar J, and having on its outer end a hollow handle, K. In this handle is a coiled spring, $b$, held in place by a collar, $d$. The lock-bar J has a slot its full length, with enlargements at top and bottom, and curving outward at the lower end to the frame A, where it is fastened by bolts. $e\ e$ are supports or posts on the frame A, on which the plate or frame E rests. L is a tangent-wheel. M is a shaft, carrying the worm pinion or screw $f$, which works in the tangent-wheel L, for the purpose hereinafter mentioned. By moving the handle K back on the lever I, said lever is liberated from the lock-bar J, and can be raised to the top thereof. By this movement the plate E and its attachments are elevated by the arms H turning in the brackets $a\ a$, and by this movement the tangent-wheel L is disengaged from the worm-screw $f$, for the purpose of throwing out of gear or stopping the flow of corn while turning at the ends of rows or drills, or while moving from place to place; and by lowering the lever the machine is again put in position for feeding the corn. The spring $b$ in the handle forces and holds said handle firmly in the enlargement in the lock-bar. By this simple arrangement the operator can at will stop or start the flow of grain. The frame or plate E has a groove, $x$, around its outer edge, which groove is provided with a series of holes or outlets, $y$. This groove is for the purpose of receiving the chaff, chippings, or dirt that may be in the corn or seeds, and that works into and between the plates N and E, thereby preventing the binding of said plates, lessening the friction, and giving greater durability to the entire machine. The chippings and dirt that work down between the plates N and E are carried out to the outer edges of the plates by the centrifugal force of said plates, and deposited into the groove $x$, from which it works out at the openings or outlets $y$. The plate N, being thus left free from obstructions, works smoothly and easily, without that amount of friction that would necessarily have to be overcome if chippings were left between the plates. O is a cap ring or plate, to which the hopper or seed-box G is fastened. This cap-ring is bolted to the frame-plate E, and has on its outer and under side a groove, corresponding with the groove $x$ in the plate E, the inner edge of the ring O overlapping the upper and outer edge of the plate N without touching said plate. P is a cut-off bar, forming a part of the ring O, and having its ends next to said cap-ring curved, as shown at $i$, and a straight front, as shown at $h$. The cap-ring O forms a firm support for the hopper G, and said hopper is firmly held in place by the cut-off P. This cut-off, being curved at its ends, forms a firm support for the brush $m$, by which means the grain or corn is prevented from working around the brush and interfering with the proper delivery of the corn. The inner edge of the ring O is so constructed as to overlap the outer edge of the drop-plate N, but not close enough to touch the same, and by this arrangement said drop-plate can revolve without rubbing at any point, except where it rests on the plate E. The drop-plate N has a conical center, and is, near the outer edge, provided with a series of oblong holes, $z$, as shown. The tangent-wheel L is fastened to the lower end of a shaft, R, which passes upward through a box formed in the center of the frame or plate E, said box extending down within the cup-shaped tangent-wheel, as shown in Fig. 3. At the upper end of the shaft R is an oil-chamber, $n$, closed by means of a stopper, $p$, and provided with an oil-hole, $s$. The conical center of the drop-plate N is fastened to the upper end of the shaft R by a pin, $t$, and admits of having a long box, $k$, so as to give a long bearing for the shaft, and not interfering or cramping the plate N as it is carried or turned by the pin $t$. The object in making the holes $z$ in the plate N oblong in shape is for the purpose of preventing the delivery of more than one grain of corn at a time. These holes should be about three-fourths of an inch long and three-eighths of an inch in width, which size will not admit of two small or medium grains of corn getting in end to end, nor side by side, but will invariably receive the medium or the very largest kernels, and deliver into the conductor one grain at a time. The farmer can plant any variety of corn he desires—the very deepest grained, as well as the medium—which cannot be done successfully with the usual round dropping-holes. The holes $z$ are made in a circle concentric with the plate; but they may also be made obliquely in the plate, which will answer precisely the same purpose. S represents the knocker, hinged or pivoted to a slotted plate, $w$, which is fastened to the hopper by a bolt, and can be adjusted so as to lengthen or shorten the knocker.

The operation of our machine is as follows: Power being transmitted from the ground or drive wheel by suitable gearing to the shaft M, the shaft R is rotated through the means of the worm $f$ and wheel L, so that the plate N will be revolved around and under the corn in the hopper. This plate, in its revolutions in the hopper, receives the grains of corn in the holes $z$, and carries them out of the hopper by passing under the brush $m$, and along to the outlet $v$ in the plate E, where they are knocked or dropped through by the knocker S into the funnel D, and pass through said funnel and hoe B to be deposited in the ground.

Having thus fully described our invention, what we claim as new, and desire to secure by Letters Patent is—

1. The frame-plate E, provided with the circular groove $x$, with outlets $y$ $y$, substantially as and for the purposes herein set forth.

2. The combination of the conical drop-plate N with frame-plate E, having the hollow central box $k$ formed therewith, the shaft R extended through and above the drop-plate, secured by the key $t$, and provided with the oil-chamber $n$, stopper $p$, and hole $s$, all substantially as and for the purposes set forth.

3. The hopper G, lever I, handle K, spring $b$, and lock-bar J, all constructed and combined substantially as and for the purposes herein set forth.

In testimony that we claim the foregoing we have hereunto set our hands this 3d day of June, 1875.

JOHN R. RUDE.
SQUIRE B. RUDE.
GEORGE W. RUDE.

Witnesses:
GEORGE DEACON,
BART BURKE.